United States Patent
Ebert (10) Patent No.: US 9,594,705 B2
(45) Date of Patent: Mar. 14, 2017

(54) EMI MITIGATION ON HIGH-SPEED LANES USING FALSE STALL

(71) Applicant: Intel Corporation, Santa Clara, CA (US)

(72) Inventor: Gregory L. Ebert, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 181 days.

(21) Appl. No.: 14/125,522

(22) PCT Filed: Oct. 23, 2013

(86) PCT No.: PCT/US2013/066418
§ 371 (c)(1),
(2) Date: Dec. 11, 2013

(87) PCT Pub. No.: WO2015/060845
PCT Pub. Date: Apr. 30, 2015

(65) Prior Publication Data
US 2015/0113196 A1    Apr. 23, 2015

(51) Int. Cl.
| G06F 13/28 | (2006.01) |
| G06F 3/00 | (2006.01) |
| G06F 5/00 | (2006.01) |
| G06F 13/00 | (2006.01) |
| G06F 13/20 | (2006.01) |
| G06F 13/26 | (2006.01) |
| G06F 9/45 | (2006.01) |
| G06F 9/52 | (2006.01) |

(52) U.S. Cl.
CPC .............. *G06F 13/26* (2013.01); *G06F 8/458* (2013.01); *G06F 9/52* (2013.01); *G06F 9/522* (2013.01)

(58) Field of Classification Search
CPC ....... G06F 1/266; G06F 1/1689; G06F 1/1698
USPC ................................ 710/313, 25, 58, 61, 100
See application file for complete search history.

(56) References Cited

U.S. PATENT DOCUMENTS 6,961,280 B1 * 11/2005 Pan ..................... G06F 12/0895
    365/230.01
8,996,892 B1 * 3/2015 Chu ........................ G06F 1/325
    710/62

(Continued)

OTHER PUBLICATIONS

International Search Report and Written Opinion received for PCT Patent Application No. PCT/US2013/066418, mailed on Jun. 27, 2014, 10 pages.

(Continued)

*Primary Examiner* — Idriss N Alrobaye
*Assistant Examiner* — Getente A Yimer
(74) *Attorney, Agent, or Firm* — Alpine Technology Law Group LLC (57) ABSTRACT

Methods and apparatus relating to techniques for Electromagnetic Interference (EMI) mitigation on high-speed lanes using false stall are described. In one embodiment, protocol logic determines whether to perform a false stall operation on a lane in response to a determination that no data is to be sent over the lane and that data is being transmitted over the lane. The false stall operation includes sending one or more training symbols (e.g., immediately) after an End Of Burst (EOB) signal over the lane, instead of allowing the lane to stall. Other embodiments are also disclosed.

22 Claims, 7 Drawing Sheets

(56) References Cited

U.S. PATENT DOCUMENTS

| | | | |
|---|---|---|---|
| 2005/0149769 A1* | 7/2005 | O'Connor | G06F 1/3203 |
| | | | 713/300 |
| 2009/0172429 A1* | 7/2009 | Rachakonda | G06F 1/3203 |
| | | | 713/310 |
| 2011/0060931 A1* | 3/2011 | Radhakrishnan | G06F 1/3203 |
| | | | 713/340 |
| 2013/0159591 A1* | 6/2013 | Acuna | G06F 11/221 |
| | | | 710/310 |
| 2013/0191568 A1 | 7/2013 | Hershko et al. | |
| 2013/0238935 A1 | 9/2013 | Radulescu | |
| 2013/0262731 A1 | 10/2013 | Ranganathan et al. | |
| 2013/0262892 A1 | 10/2013 | Radulescu | |

OTHER PUBLICATIONS

Communication received from European Office for European Patent Application No. 13896187.5, mailed on Jun. 22, 2016, 2 pages.
International Preliminary Report on Patentability received for International Application No. PCT/US2013/066418, mailed on May 6, 2016, 7 pages.
"M-PHY V.2.00 Specification Data Sheet", Specification, 3 pages, MIPI Alliance.
"MIPI Allicance Speeds up M-PHY and Expands UniPro Specification for Mobile Device Applications", Press Release, Jun. 22, 2011, 3 pages, Shanghai, China.

\* cited by examiner

EMI MITIGATION ON HIGH-SPEED LANES USING FALSE STALL

FIELD

The present disclosure generally relates to the field of electronics. More particularly, an embodiment relates to techniques for Electromagnetic Interference (EMI) mitigation on high-speed lanes using false stall.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details ale set forth in order to provide a thorough understanding of various embodiments. However, some embodiments truly be practiced without the specific details. In other instances, well-known methods, procedures, components, and circuits have not been described in detail so not to obscure the particular embodiments. Various aspects of embodiments nay be performed using various means, such as integrated semiconductor circuits ("hardware"), computer-readable instructions organized into one or more programs ("software") or some combination of hardware and software. For the purposes of this disclosure reference to "logic" shall mean either hardware software, or some combination thereof.

The MIPI (Mobile Industry Processor Interface) standards group has published a physical layer standard called M-PHY® (M-PHY Specification, v2.0, June 2011) for chip-to-chip communication on a mobile processing platform. When an M-PHY lane has no data to send, it can either "stall" (turn off the lane) or "fill" (keep the lane active). In general, it will take some amount of time to restart the lane after a stall, which will increase the bus or interconnect latency. If this latency is not acceptable the M-PHY lane would have to "fill," in which case the TX (transmitter) will send a static "filler" data pattern. There may be sortie instances where a lane is mostly sending "fill" patterns.

Sending repeating patterns can cause Electromagnetic Interference (EMI) problems, which would negatively affect the quality of signal transmission and may cause delays as data may have be resent, data incorrectness, slowing down of transmission speeds because a lane would have to be slowed down to reduce EMI effects, etc.

To this end, some embodiments mitigate EMI on a high-speed lane (such as an M-PHY lane) using false stall. In an embodiment, a "false stall" refers to keeping an M-PHY lane active and avoiding transmission of repeating "fill" symbols while still working within the parameters of the M-PHY specification. In false stall, a TX that has no data to send would signal that it is going into "stall" and then immediately start sending training symbol(s) for the next burst (e.g., in place of sending a fill signal/packet). Since the lane is not inactive for an appreciable length of time (e.g., 20 UI) and starts training before there is data to be sent, the bus/interconnect latency will be minimal (e.g., RX (Receiver) will likely not lose lock). Moreover, a static data pattern may be avoided since the training symbols are D-words (called SYNC), of which there are many valid symbols to choose, and they may be randomized. Further, since the SYNC patterns are not treated as valid data they may be chosen for better EMI performance.

Figure 1:
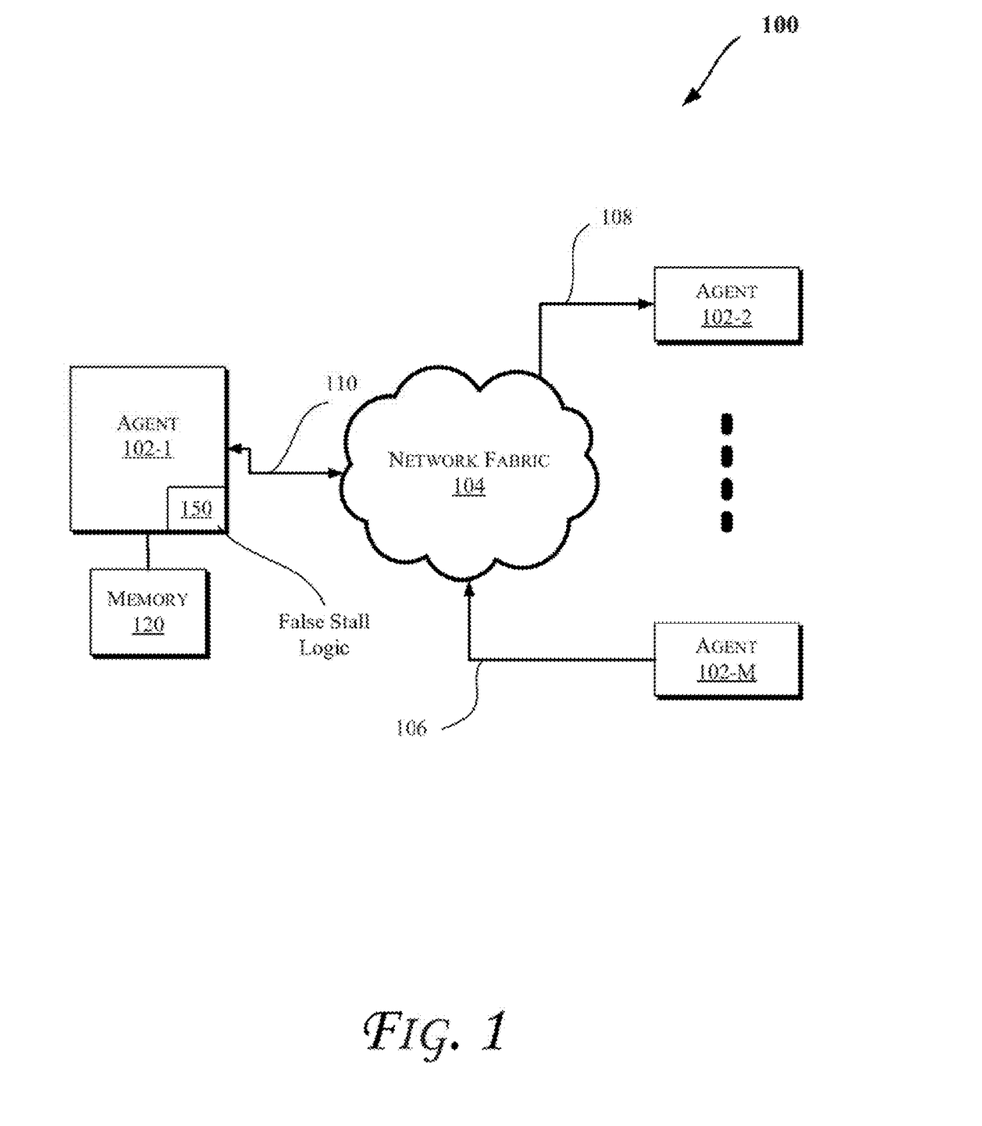
FIG. 1 illustrates a block diagram of an embodiment of a computing systems, which can be utilized to implement various embodiments discussed herein.

Various computing systems may be used to implement embodiments, discussed herein, such as the Systems discussed with reference to FIGS. 1-2 and 5-7. More particularly, FIG. 1 illustrates a block diagram of a computing system 100, according to an embodiment. The system 100 may include one or more agents 102-1 through 102-M (collectively referred to herein as "agents 102" or more generally "agent 102"). In an embodiment, one or more of the agents 102 may be any of components of as computing system, such as the computing systems discussed with reference to FIGS. 5-7.

As illustrated in FIG. 1, the agents 102 may communicate via a network fabric 104. In one embodiment, the network fabric 104 may include a computer network that allows various agents such as computing devices) to communicate data. In an embodiment, the network fabric 104 may include one or more interconnects (or interconnection networks) that communicate via a serial (e.g., point-to-point link and/or a shared communication network (which may be configured as a ring in an embodiment). Each link may include one or more lanes. For example, some embodiments may facilitate component debug or validation on links that allow communication with Fully Buffered Dual in-line memory modules (FBD), e.g., where the FBD link is a serial link for coupling memory modules to a host controller device (such as at processor or memory huh). Debug information may be transmitted from the FBD channel host such that the debug information may be observed along the channel by channel traffic trace capture tools (such as one or more logic analyzers).

In one embodiment, the system 100 may support a layered protocol scheme, which may include as physical layer, a link layer, a routing layer, a transport layer, and/or a protocol layer. The fabric 104 may further facilitate transmission of data e.g., in form of packets) from one protocol (e.g., caching processor or caching aware memory controller) to another protocol for a point-to-point or shared network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via) a unidirectional link 108), while some agent(s) (such as agent 102-1) may both transmit and receive data (e.g., via at bidirectional link 110).

Additionally, at least one of the agents 102 may be as home agent and one or more of the agents 102 may be requesting or caching agents. Generally, requesting/caching agents send request(s) to a home node/agent for access to a memory address with which a corresponding "home agent" is associated. Further, in an embodiment, one or more of the agents 102 (only one shown for agent 102-1) may have access to a memory (which may be dedicated to the agent or shared with other agents) such as memory 120. In some embodiments, each (or at least one) of the agents 102 may be coupled to the memory 120 that is either on the same die as the agent or otherwise accessible by the agent. Also, as shown in FIG. 1, agents 102 include false stall logic 150 (e.g., on the transmitter side) to reduce EMI on interconnect lanes(s).

Figure 2:
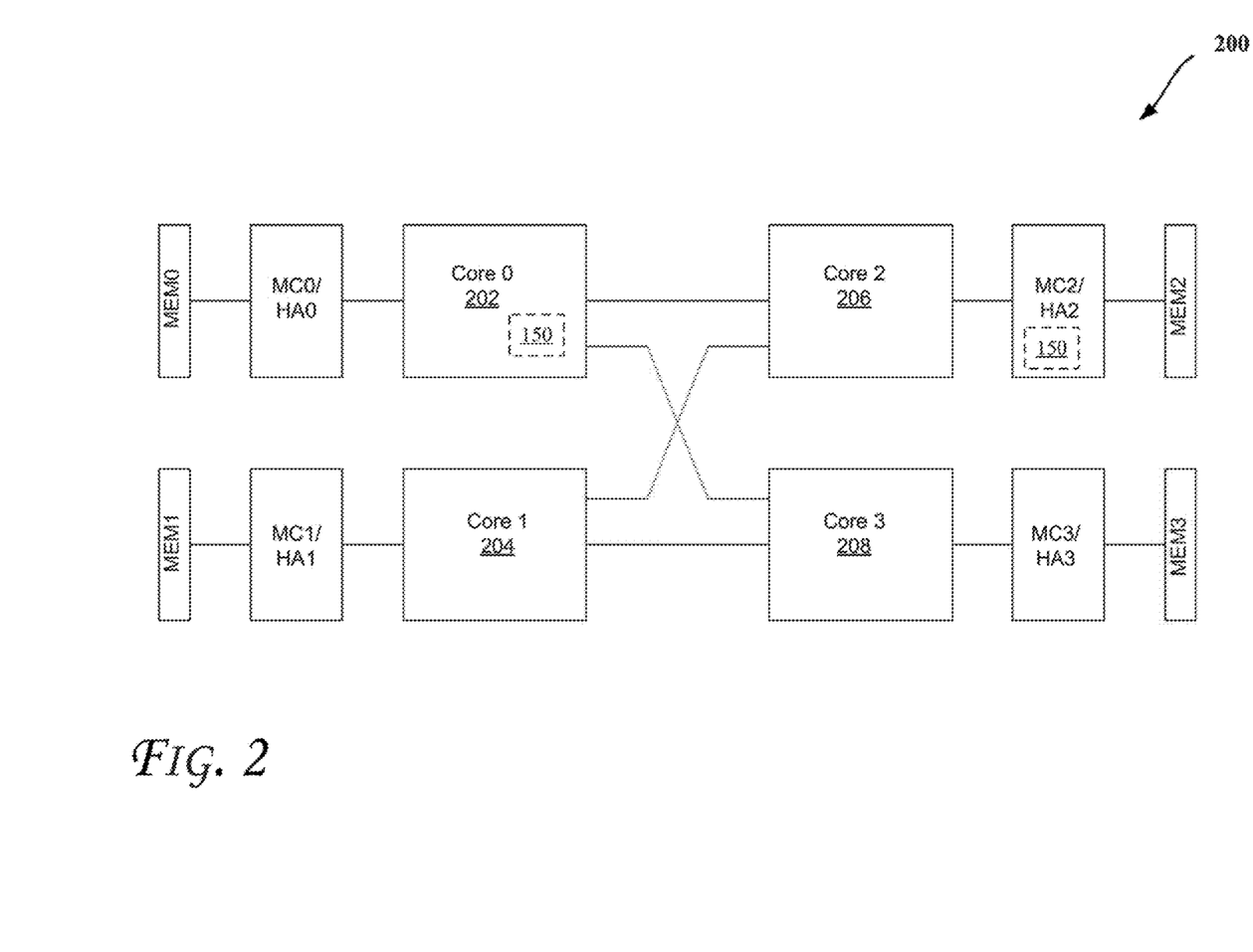
FIG. 2 illustrates a block diagram of an embodiment of a computing system, which can be utilized to implement one or more embodiments discussed herein.

FIG. 2 is a block diagram of at computing system 200 in accordance with an embodiment. System 200 includes a plurality of sockets 202-208 (four shown but some embodiments can have more or less socket). Each socket includes a processor. Also, various agents in the system 200 can communicate via logic 150. Even though logic 150 is only shown in items 202 and MC2/HA2, logic 150 may be provided in other agents of system 200. Further, more or less logic blocks can be present in a system depending on the implementation. Additionally, each socket is coupled to the other sockets via a point-to-point (PtP) link, or at differential interconnect, such as a Quick Path Interconnect (QPI), MIPI (Mobile Industry Processor Interface), etc. As discussed with respect the network fabric 104 of FIG. 1, each socket is coupled to a local portion of system memory, e.g., formed by a plurality of Dual Inline Memory Modules (DIMMs) that include dynamic random access memory (DRAM).

In another embodiment, the network fabric may be utilized for any System on Chip (SoC or SOC) application, utilize custom or standard interfaces, such as, ARM compliant interfaces for AMBA (Advanced Microcontroller Bus Architecture), OCP (Open Core Protocol), MIPI (Mobile Industry Processor Interface), PCI (Peripheral Component Interconnect) or PCIe (Peripheral Component Interconnect express).

Some embodiments use a technique that enables use of heterogeneous resources, such as AXI/OCP technologies, in a PC (Personal Computer) based system such as a PCI-based system without making any changes to the IP resources themselves. Embodiments provide two very thin hardware blocks, referred to herein as a Yunit and a shim, that can be used to plug AXI/OCP IP into an auto-generated interconnect fabric to create PCI-compatible systems. In one embodiment a first (e.g., a north) interface of the Yunit connects to an adapter block that interfaces to a PCI-compatible bus such as a direct media interface (DMI) bus, a PCI bus, or a Peripheral Component Interconnect Express (PCIe) bus. A second (e.g., south) interface connect directly to a non-PC interconnect, such as an AXI/OCP interconnect. In various implementations, this bus may be an OCP bus.

In some embodiments, the Yunit implements PCI enumeration by translating PCI configuration cycles into transactions that the target IP can understand. This unit also performs address translation from re-locatable PCI addresses into fixed AXI/OCP addresses and vice versa. The Yunit may further implement an ordering mechanism to satisfy a producer-consumer model (e.g., a PCI producer-consumer model). In turn, individual IPs are connected to the interconnect via dedicated PCI shims. Each shim may implement the entire PCI header for the corresponding IP. The Yunit routes all accesses to the PCI header and the device memory space to the shim. The shim consumes all header read/write transactions and passes on other transactions to the IP. In some embodiments, the shim also implements all power management related features for the IP.

Thus, rather than being a monolithic compatibility block, embodiments that implement a Yunit take a distributed approach. Functionality that is common across all IPs, e.g., address translation and ordering, is implemented in the Yunit, while IP-specific functionality such as power management, error handling, and so forth, is implemented in the shims that are tailored to that IP.

In this way, a new IP can be added with minimal changes to the Yunit. For example, in one implementation the changes may occur by adding a new entry in an address redirection table. While the shims are IP-specific, in some implementations a large amount of the functionality (e.g., more than 90%) is common across all IPs. This enables a rapid reconfiguration of an existing shim for a new IP. Some embodiments thus also enable use of auto-generated interconnect fabrics without modification. In a point-to-point bus architecture, designing interconnect fabrics can be a challenging task. The Yunit approach described above leverages an industry ecosystem into a PCI system with minimal effort and without requiring any modifications to industry-standard tools.

As shown in FIG. 2, each socket is coupled to a Memory Controller (MC)/Home Agent (HA) (such as MC0/HA0 through MC3/HA3). The memory controllers are coupled to a corresponding local memory (labeled as MEM0 through MEM3), which can be a portion of system memory (such as memory 912 of FIG. 9). In some embodiments, the memory controller (MC)/Home Agent (HA) (such as ME0/HA0 through MC3/HA3) can be the same or similar to agent 102-1 of FIG. 1 and the memory, labeled as MEM0 through MEM3, can be the same or similar to memory devices discussed with reference to any of the figures herein. Also, in one embodiment, MEM0 through MEM3 can be configured to mirror data, e.g., as master and slave. Also, one or more components of system 200 can be included on the same integrated circuit die in some embodiments.

Furthermore, one implementation such as shown in FIG. 2) is for a socket glueless configuration with mirroring. For example, data assigned to a memory controller (such as MC0/HA0) is mirrored to another memory controller (such as MC3/HA3) over the PtP links.

Figure 3:
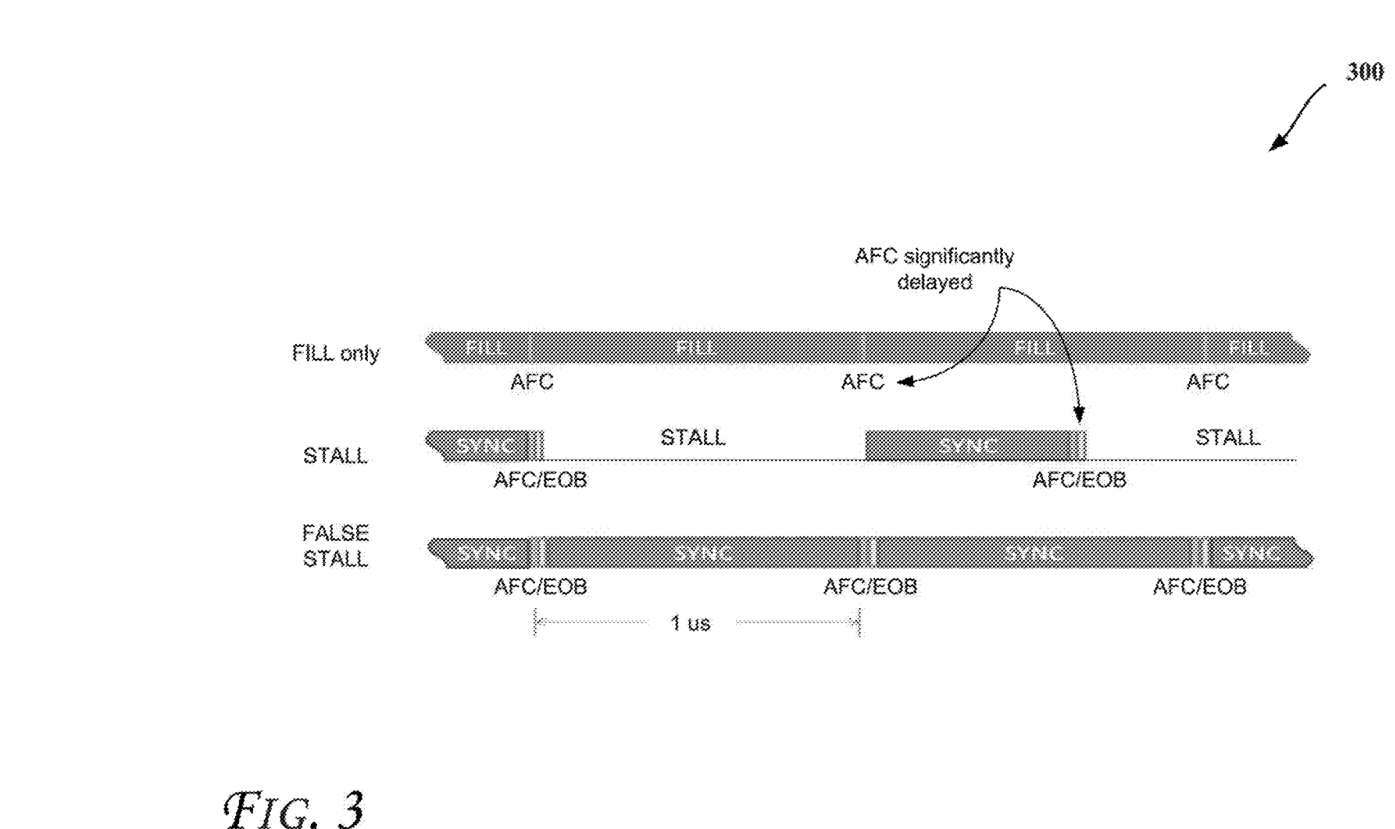
FIG. 3 illustrates a timing diagram of the interface behavior for fill, normal stall, and false stall scenarios, according to some embodiments.

FIG. 3 illustrates a timing diagram of the interface behavior for fill, stall, and false stall scenarios, according to some embodiments. More specifically, FIG. 3 shows false stall relative to static fill or a normal stall process for a very lightly loaded hut delay sensitive M-PHY lane. This scenario is areal world concern for M-PHY links that have very asymmetric data traffic, in which case in one direction the only data to be sent is AFC (Acknowledgement and Flow Control) packets (which refers to data being transmitted which may be relatively small but sent regularly). If these AFC packets are delayed, it may significantly reduce the throughput of the M-PHY link. As illustrated in FIG. 3, for normal stall (and not fill), a SYNC needs to occur after an EOB (End Of Burst) signal/packet before the next AFC is transmitted (which adds a significant of bus/interconnect latency delay).

One consideration of false stall is that the protocol logic (e.g., logic 150) needs to decide when to implement it instead of fill or normal stall (even though this is a M-PHY issue, the control of this may be done the protocol level). This is actually not only a problem for false stall, the controller will need to decide when to fill or normal shill but the M-PHY specification does not currently specifically define how to make that decision and the protocol specification is vague. In general, the protocol logic should be aware if it has no data to send immediately but will need to send data soon. An example of this is if a host or device is receiving a UniPro® (Unified Protocol, e.g., in accordance with UniPro Specification, v1.41, June 2012) data packet (which may be quite short) and will need to send an AFC in a short period of time (e.g., few microseconds for UniPro). In this scenario, the protocol logic may choose to do as false stall instead of normal stall or fill. The protocol logic could be configured via proprietary logic (e.g., a register and/or a fuse) to default to fill or false stall.

Figure 4:
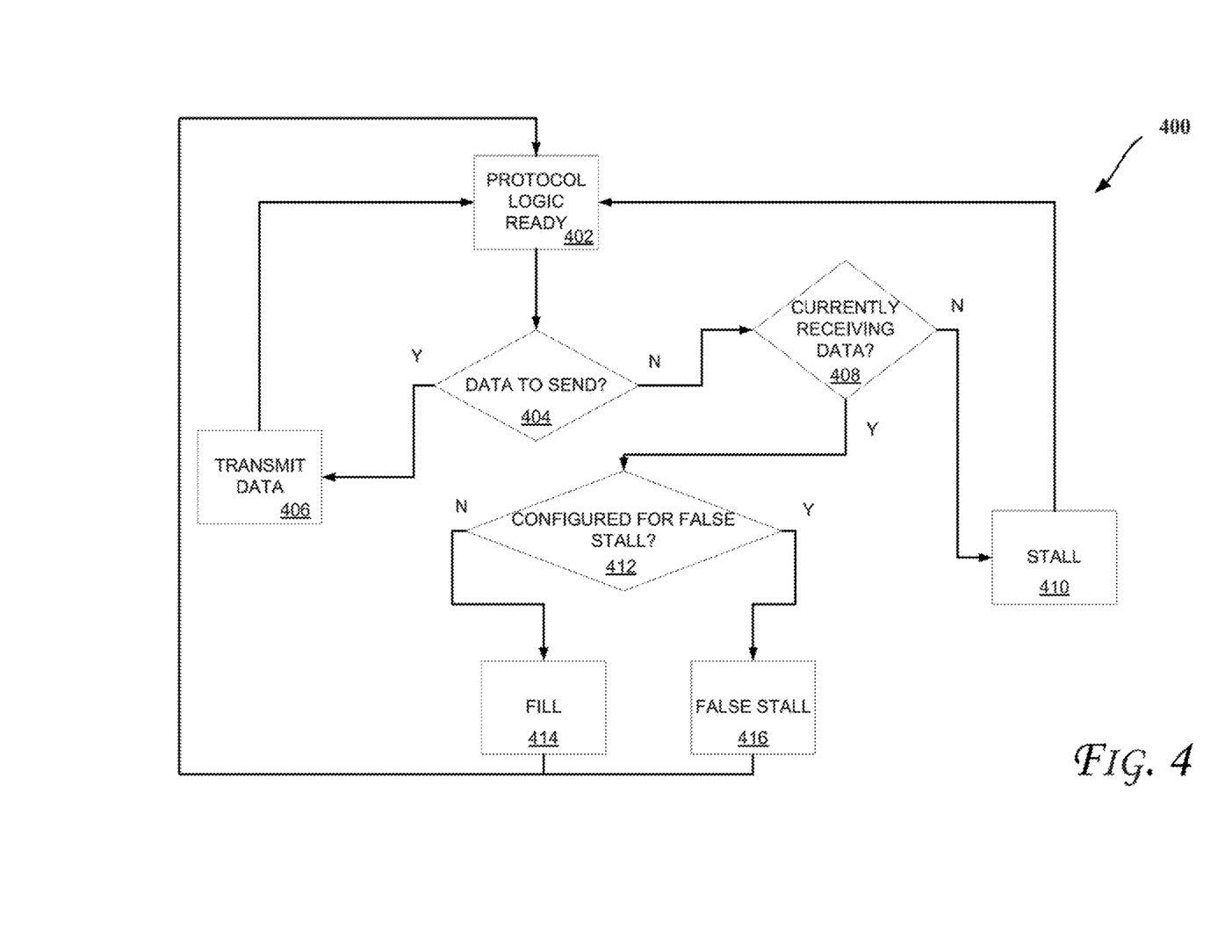
FIG. 4 illustrates a flow diagram of at method for making a selection between fill, normal stall, and false stall techniques, according to an embodiment.

FIG. 4 illustrates a flow diagram of a method 400 for making a selection between fill, normal stall, and false stall techniques, according to an embodiment. More particularly, the method shown in FIG. 4 may be used by logic 150. Moreover, FIG. 4 shows as simplified decision tree for the protocol logic (e.g., logic 150) to decide between fill, stall, and false stall in an embodiment.

Referring to FIGS. 1-4, once the protocol logic (e.g., logic 150) is ready at an operation 402, it is determined whether to send data on the lane (e.g., a M-PHY lane) at an operation 404. If data is to be sent, data is transmitted at an operation 406 and method 400 returns to operation 402; otherwise, it is determined whether data is being currently received at an operation 408. If data is not currently being receive, normal stall is selected and performed at an operation 410.

At operation 408, if data is being received, an operation 412 determines whether to configure for false stall. If not, at an operation 414, fill is selected; otherwise, false stall is selected at an operation 416. As shown in FIG. 4, method 400 returns to operation 402 after each of the operations 410, 414, and 416.

As discussed above, false stall avoids sending repeating fill codes and instead sends SYNC codes, which can be randomized. This will substantially reduce EMI. In other words, false stall provides a way to approximate a scrambled logical idle. Furthermore, false stall reduces EMI at no cost (e.g., without incurring bus/interconnect latency or increasing power draw) relative to sending fill. Without this technique, an M-PHY bus/interconnect may need to use a very expensive cable such as micro-coax). False stall may allow for use of a very inexpensive cable instead (e.g., twisted pair). For example, for a 1 m cable the difference in BOM (Bill Of Materials) cost between micro-coax and twisted pair may be two to three dollars. Also, since other EMI mitigation techniques such as shielding and grounding can be expensive and somewhat hit or miss, any EMI mitigation that is done by changing the source signal is very useful.

Figure 5:
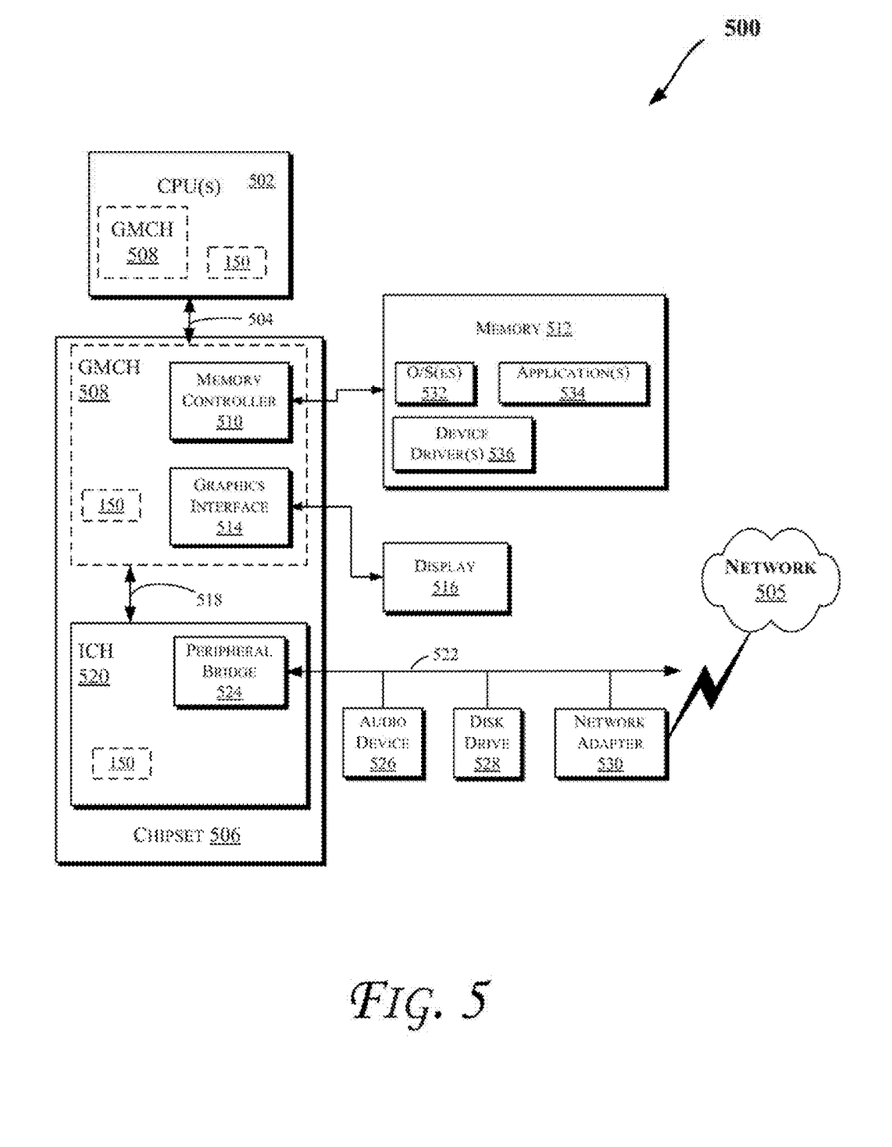
FIG. 5 illustrates a block diagram of an embodiment of a computing system, which can be utilized to implement one or more embodiments discussed herein.

FIG. 5 illustrates a block diagram of an embodiment of a computing system 500. One or more of the agents 102 of FIG. 1 may comprise one or more components of the computing system 500. Also, various components of the system 500 may include logic 150 as illustrated in FIG. 5. However, logic 150 may be provided in locations throughout the system 500, including or excluding those illustrated. The computing system 500 may include one or more central processing unit(s) (CPUs) 502 (which may be collectively referred to herein as "processors 502" or more generically "processor 502") coupled to an interconnection network (or bus) 504. The operations discussed with reference to FIGS. 1-4 may be performed by one or more components of the system 500.

The processors 502 may be any type of processor such as a general purpose processor, a network processor (which may process data communicated over a computer network 505), etc. (including a reduced instruction set computer (RISC) processor or a complex instruction set computer (CISC). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors.

The processor 502 may include, one or more caches, which may be private and/or shared in various embodiments. Generally, a cache stores data corresponding to original data stored elsewhere or computed earlier. To reduce memory access latency, once data is stored in a cache, future use may be made by accessing a cached copy rather than prefetching or recomputing the original data. The cache(s) may be any type of cache, such a level 1 (L1) cache, a level 2 (L2) cache, a level 3 (L3), a mid-level cache, a last level cache (LLC), etc. to store electronic data (e.g., including instructions) that is utilized by one or more components of the system 500. Additionally, such cache(s) may be located in various locations (e.g., inside other components to the computing systems discussed herein, including systems of FIG. 1, 2, 5, or 6).

A chipset 506 may additionally be coupled to the interconnection network 504. Further, the chipset 506 may include a graphics memory control hub (GMCH) 508. The GMCH 508 may include a memory controller 510 that is coupled to a memory 512. The memory 512 may store data, e.g., including sequences of instructions that are executed by the processor 502, or any other device in communication with components of the computing system 500. Also, in one embodiment, the memory 512 may include one or more volatile storage (or memory) devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 504, such as multiple processors and/or multiple system memories.

The GMCH 508 may further include a graphics interface 514 coupled to a display device 516 (e.g., via a graphics accelerator in an embodiment). In one embodiment, the graphics interlace 514 may be coupled to the display device 516 via an Accelerated Graphics Port (AGP) or Peripheral Component. Interconnect (PCI) (or PCI express (PCIe) interface). In an embodiment, the display device 516 (such as a flat panel display) may be coupled to the graphics interface 514 through, for example, a signal converter that translates a digital representation of an image stored in a storage device such as video memory or system memory (e.g., memory 512) into display signals that are interpreted and displayed by the display 516.

As shown in FIG. 5, a hub interface 518 may couple the GMCH 508 to an input/output control hub (ICH) 520. The ICH 520 may provide an interface to input/output (I/O) devices coupled to the computing system 500. The ICH 520 may be coupled to a bus 522 through a peripheral bridge (or controller) 524, such as a Peripheral Component Interconnect (PCI) bridge that may be compliant with the PCIe specification, a universal serial bus (USB) controller, etc.

The bridge 524 may provide a data path between the processor 502 and peripheral devices. Other types of topologies may be utilized. Also, multiple buses may be coupled to the ICH 520, e.g., through multiple bridges or controllers. Further, the bus 522 may comprise other types and configurations of bus systems. Moreover, other peripherals coupled to the ICH 520 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 522 may be coupled to an audio device 526, one or more disk drive(s) 528, and a network adapter 530 (which may be a NIC in an embodiment). In one embodiment, the network adapter 530 or other devices coupled to the bus 522 may communicate with the chipset 506. Also, various components (such as the network adapter 530) may be coupled to the GMCH 508 in some embodiments. In addition, the processor 502 and the GMCH 508 may be combined to form a single chip. In an embodiment, the memory controller 510 may be provided in one or more of the CPUs 502. Further, in an embodiment, GMCH 508 and ICH 520 may be combined into a Peripheral Control Hub (PCH).

Additionally, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), as floppy disk, a compact disk ROM (CD-ROM), a digital versatile disk (DVD), flash memory, a magneto-optical disk, or other types of nonvolatile machine-readable media capable of storing electronic data (e.g., including instructions).

The memory 512 may include, one or more of the following in an embodiment: an operating system (O/S) 532, application 534, and/or device driver 536. The memory 512 may also include regions dedicated to Memory Mapped I/O (MMIO) operations. Programs and/or data stored in the memory 512 may be swapped into the disk drive 528 as part of memory management operation. The application(s) 534 may execute (e.g., on the processor(s) 502) to communicate one or more packets with one or more computing devices coupled to the network 505. In an embodiment, a packet may be a sequence of one or more symbols and/or values that may be encoded by one or more electrical signals transmitted from at least one sender to at least on receiver (e.g., over a network such as the network 505). For example, each packet may have a header that includes various information which may be utilized in routing and/or processing the packet, such as a source address, a destination address, packet type, etc. Each packet may also have a payload that includes the raw data (or content) the packet is transferring between various computing devices over a computer network (such as the network 505).

In an embodiment, the application 534 may utilize the O/S 532 to communicate with various components of the system 500, e.g., through the device driver 536. Hence, the device driver 536 may include network adapter 530 specific commands to provide a communication interface between the O/S 532 and the network adapter 530, or other I/O devices coupled to the system 500, e.g., via the chipset 506.

In an embodiment, the O/S 532 may include a network protocol stack. A protocol stack generally refers to a set of procedures or programs that, may be executed to process packets sent over a network 505, when the packets may conform to a specified protocol. For example, TCP/IP (Transport Control Protocol/Internet Protocol) packets may be processed using a TCP/IP stack. The device driver 536 may indicate the buffers in the memory 512 that are to be processed, e.g., via the protocol stack.

The network 505 may include any type of computer network. The network adapter 530 may further include a direct memory access (DMA) engine, which writes packets to buffers (e.g., stored in the memory assigned to available descriptors (e.g., stored in the memory 512) to transmit and/or receive data over the network 505. Additionally, the network adapter 530 may include a network adapter controller, which may include logic (such as one or more programmable processors) to perform adapter related operations. In an embodiment, the adapter controller may be a MAC (media access control) component. The network adapter 530 may further include a memory, such as any type of volatile/nonvolatile memory (e.g., including one or more cache(s) and/or other memory types discussed with reference to memory 512).

Figure 6:
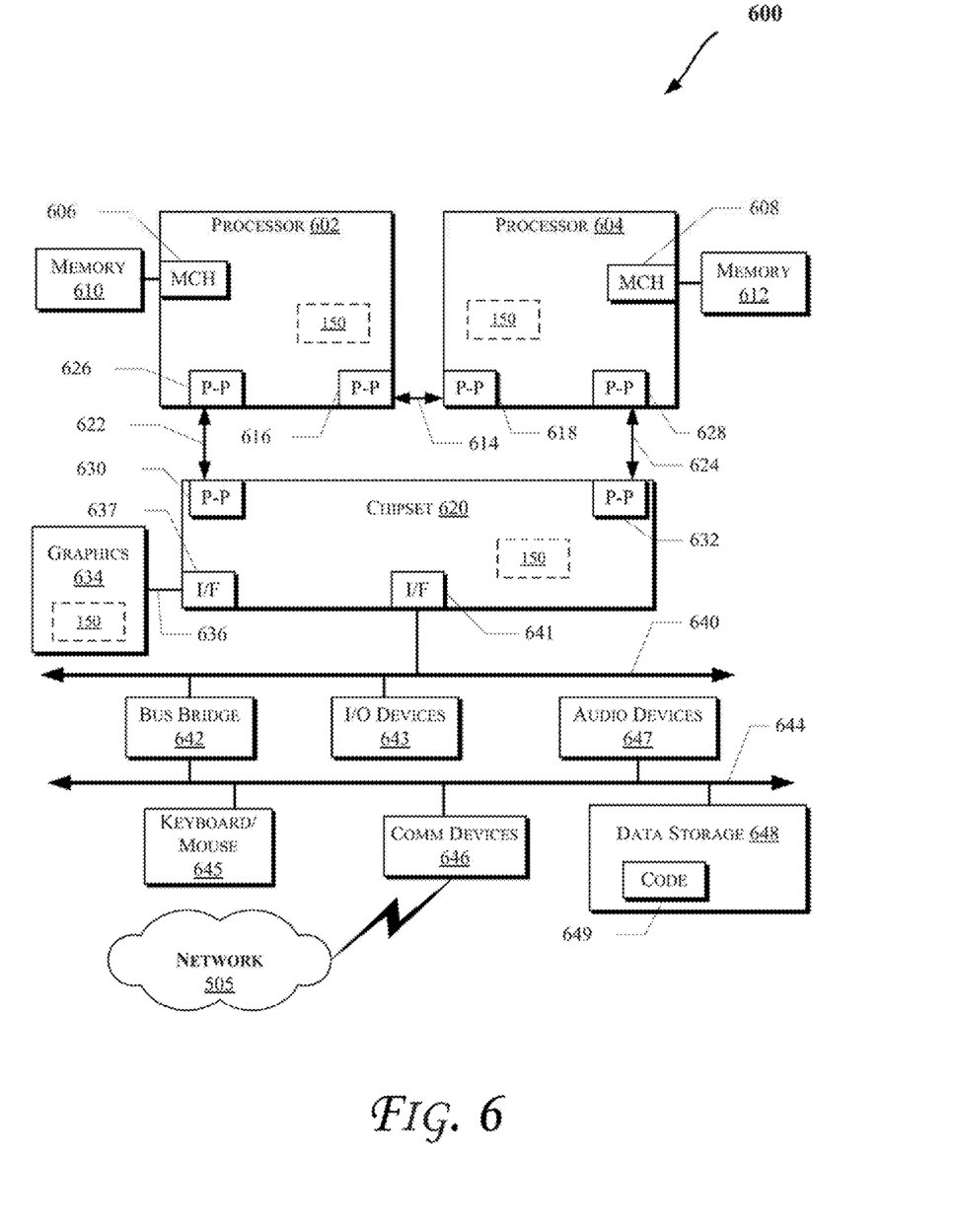
FIG. 6 illustrates a block diagram of an embodiment of a computing system, which can be utilized to implement one or more embodiments discussed herein.

FIG. 6 illustrates a computing system 600 that is arranged in a point-to-point (PtP) configuration, according to an embodiment. In particular, FIG. 6 shows a system where processors, memory, and input/output devices are interconnected by a number of to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local Memory Controller Hub (MCH) 606 and 608 to enable communication with memories 610 and 612. The memories 610 and/or 612 may store various data such as those discussed with reference to the memory 612 of FIG. 6. As shown in FIG. 6, the processors 602 and 604 (or other components of system 600 such as chipset 620. I/O devices 643, etc.) may also include one or more cache(s) such as those discussed with reference to FIGS. 1-5.

In an embodiment, the processors (602 and 604 may be one of the processors 602 discussed with reference to FIG. 6. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a high-performance graphics circuit 634 via a high-performance graphics interface 636, e.g., using a PtP interface circuit 637.

In at least one embodiment, logic 150 may be provided in one or more of the processors 602, 604 and/or chipset 620. Other embodiments, however, may exist in other circuits, logic units, or devices within the system 600 of FIG. 6. Furthermore, other embodiments may be distributed throughout several circuits, logic units, or devices illustrated in FIG. 6. For example, various components of the system 600 may include the logic 150 of FIG. 1. However, logic 150 may be provided in locations throughout the system 600, including or excluding those illustrated.

The chipset 620 may communicate with the bus 640 using a PtP interface circuit 641. The bus 640 may have, one or more devices that communicate with it, such as a bus bridge 642 and 110 devices 643. Via a bus 644, the bus bridge 642 may communicate with other devices such as a keyboard/mouse 645, communication devices 646 (such as modems, network interface devices, or other communication devices that may communicate with the computer network 605), audio I/O device, and/or a data storage device 648. The data storage device 648 may store code 649 that may be executed by the processors 602 and/or 604.

Figure 7:
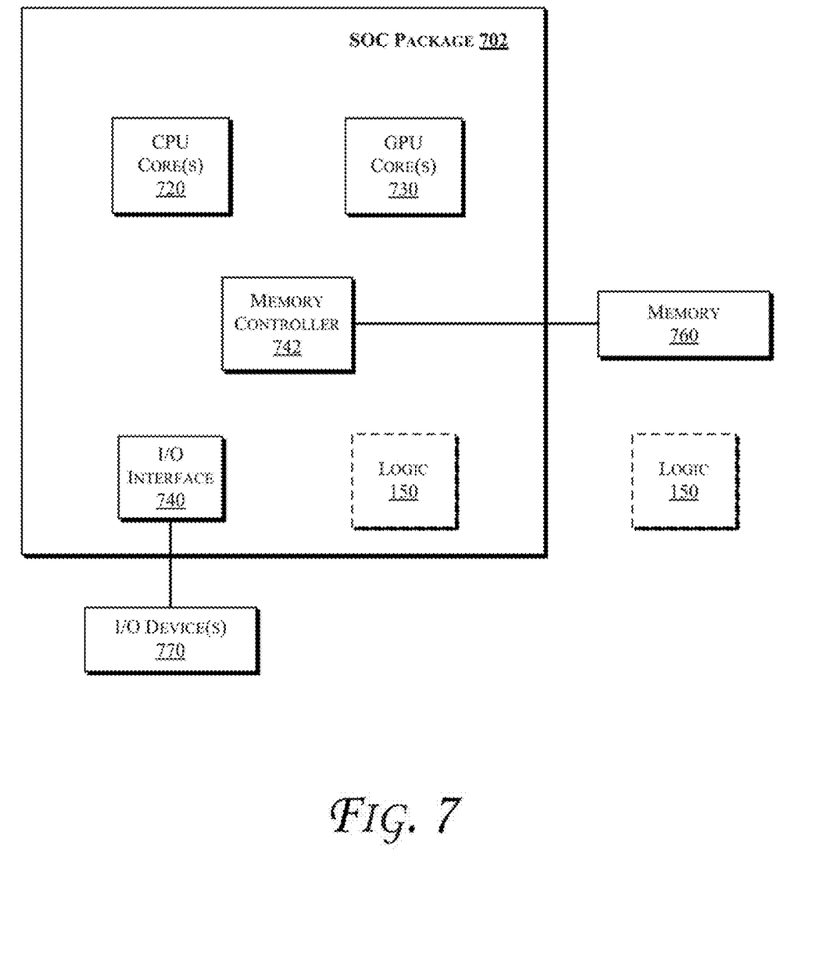
FIG. 7 illustrates a block diagram of an System On Chip (SOC) package in accordance with an embodiment.

In some embodiments, one or more of the components discussed herein can be embodied as a System On Chip (SOC) device. FIG. 7 illustrates a block diagram of an SOC package in accordance with an embodiment. As illustrated in FIG. 7, SOC 702 includes one or more Central Processing Unit (CPU) cores 720, one or more Graphics Processor Unit (GPU) cores 730, an Input/Output (I/O) interface 740, and a memory controller 742. Various components of the SOC package 702 may be coupled to an interconnect or bus such as discussed herein with reference to the other figures. Also, the SOC package 702 may include more or less components, such as those discussed herein with reference to the other figures. Further, each component of the SOC package herein may include one or more the other components, e.g., as discussed with reference to the other figures herein. In one embodiment, SOC package 702 (and its components) is provided on one or more Integrated Circuit (IC) die, e.g., which are packaged into a single semiconductor device.

As illustrated in FIG. 7, SOC package 702 is coupled to a memory 760 (which may be similar to or the same as memory discussed herein with reference to the other figures) via the memory controller 742. In an embodiment, the memory 760 (or a portion of it) can be integrated on the SOC package 702.

The I/O interface 740 may be coupled to one or more I/O devices 770, e.g., via an interconnect and/or bus such as discussed herein with reference to other figures. I/O device(s) 770 may include one or more of as keyboard, as mouse, a touchpad, a display, an image/video capture device (such as a camera or camcorder/video recorder), a touch screen, a speaker, or the like. Furthermore, SOC package 702 may include/integrate the logic 150 in an embodiment. Alternatively, the logic 150 may be provided outside of the SOC package 702 (i.e., as a discrete logic).

The following examples pertain to further embodiments. Example 1 includes a apparatus comprising: logic to determine whether to perform a false stall operation on a lane in response to a determination that no data is to be sent over the lane and that data is being transmitted over the lane, wherein the false stall operation is to comprise sending one or more training symbols after an End Of Burst (EOB) signal over the lane instead of allowing the lane to stall. Example 2 includes the apparatus of example 1, wherein the lane is to communicatively couple a first agent to a second agent. Example 3 includes the apparatus of example 1, wherein the lane is to provide a point-to-point link between a first agent and a second agent. Example 4 includes the apparatus of any of examples 2 to 3, wherein at least one of a transmitter of the first agent and a transmitter of the second agent is to comprise the logic. Example 5 includes the apparatus of example 2, wherein one or more, of the first agent and the second agent are to comprise a plurality of processor cores. Example 6 includes the apparatus of example 2, wherein one or more of the first agent and the second agent are to comprise a plurality of sockets. Example 7 includes the apparatus of example 2, wherein one or more of the first agent, the second agent, the logic, and memory are on a same integrated circuit die.

Example 8 includes the apparatus of example 1, wherein the lane is to comprise a M-PHY lane. Example 9 includes the apparatus of example 1, wherein the data being transmitted over the lane is in the form of one or more Acknowledgement and Flow Control (AFC) packets. Example 10 includes the apparatus of example 1, wherein the one or more training symbols are to comprise one or more SYNC packets.

Example 11 includes a method comprising: determining whether to perform a false stall operation on a lane in response to a determination that no data is to be sent over the lane and that data is being transmitted over the lane, wherein the false stall operation comprises sending one or more training symbols after an End Of Burst (EOB) signal over the lane instead of allowing the lane to stall. Example 12 includes the method of example 11, further comprising the lane communicatively coupling a first agent to a second agent. Example 13 includes the method of example 11, further comprising the lane providing a point-to-point link between a first agent and a second agent. Example 14 includes the method of example 12, wherein determining whether to perform the false stall is performed by at least one of a transmitter of the first agent and a transmitter of the second agent. Example 15 includes the method of example 11, wherein the lane comprises a M-PHY lane. Example 16 includes the method of example 11, further comprising transmitting the data over the lane in the form of one or more Acknowledgement and Flow Control (AFC) packets. Example 17 includes the method of example 11, wherein the one or more training symbols comprise one or more SYNC packets.

Example 18 includes a computer-readable medium comprising one or more instructions that when executed on a processor configure the processor to perform one or more operations of any of examples 11 to 17.

Example 19 includes a system comprising: a processor; and logic to determine whether to perform a false stall operation on a lane, coupled to the processor, in response to a determination that no data is to be sent over the lane and that data is being transmitted over the lane, wherein the false stall operation is to comprise sending one or more training symbols after an End Of Burst (EOB) signal over the lane instead of allowing the lane to stall. Example 20 includes the system of example 19, wherein the lane is to communicatively couple the processor to an agent. Example 21 includes the system of example 20, wherein the lane is to provide a point-to-point link between the processor and the agent. Example 22 includes the system of example 20, wherein at least one of a transmitter of the processor and a transmitter of the agent to comprise the logic.

Example 23 includes the system of example 19, wherein the lane is to comprise a M-PHY lane. Example 24 includes the system of example 19, wherein the one or more training symbols are to comprise one or more SYNC packets.

Example 25 includes an apparatus comprising means to perform a method as set forth in any of examples 11 to 17.

Example 26 includes a computer-readable medium comprising one or more instructions that when executed on a processor configure the processor to perform one or more operations to: determine, whether to perform a false stall operation on a lane in response to as determination that no data is to be sent over the lane and that data is being transmitted over the lane, wherein the false stall operation comprises sending one or more training symbols after an End Of Burst (EOB) signal over the lane instead of allowing the lane to stall. Example 27 includes the computer-readable medium of example 26, further comprising one or more instructions that when executed on the processor configure the processor to perform one or more operations to cause the lane to communicatively couple a first agent to a second agent. Example 28 includes the computer-readable medium of example 27, further comprising one or more instructions that when executed on the processor configure the processor to perform one or more operations to cause performance of the false stall operation by at least one of a transmitter of the first agent and a transmitter of the second agent. Example 29 includes the computer-readable medium of example 26, wherein the lane comprises a M-PHY lane. Example 30 includes the computer-readable medium of example 26, further comprising one or more instructions that when executed on the processor configure the processor to perform one or more operations to cause transmission of the data over the lane in the form of one or more Acknowledgement and Flow Control (AFC) packets.

Example 31 includes the computer-readable medium of example 26, wherein the one or more training symbols comprise one or more SYNC packets.

Example 32 includes an apparatus comprising: a system on a chip (SoC) including logic to couple to a lane of a serial link, the logic to cause the lane to enter into at least one of an active mode and an inactive mode, wherein the logic is to determine that no data is being sent on the lane but data is to be sent within a time period, and wherein the logic is to maintain the lane in the active mode and send training symbols during the time period in response to determining that no data is being sent on the lane but data is to be sent within the time period; and a touch interface associated with the SoC. Example 33 includes the apparatus of example 32, wherein the training symbols are randomized.

Example 34 includes the apparatus of example 32, wherein the logic is to maintain the lane in the active mode in response to a determination that the lane is configured for false install after the determination that no data is to be currently sent on the lane and that data is being currently received on the lane. Example 35 includes the apparatus of example 32, wherein the training symbols during the time period includes a false stall period. Example 36 includes the apparatus of example 32, wherein the logic includes layered stack logic, the layered stack logic including a physical layer compliant with a M-Phy specification and a protocol layer compliant with a PCIe specification.

In various embodiments, the operations discussed herein, e.g., with reference to FIGS. 1-7, may be implemented as hardware (e.g., circuitry), software, firmware, microcode, or combinations thereof, which may be provided as a computer program product, e.g., including a tangible (e.g., non-transitory) machine-readable or (e.g., non-transitory) computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-7. Additionally, such computer-readable media may be downloaded as a computer program product, wherein the program may be transferred from a remote computer (e.g., a server) to a requesting computer (e.g., a client) through data signals in a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
  logic, at least a portion of which is in hardware, to determine whether to perform a false stall operation on a lane in response to a determination that no data is to be sent over the lane for a period of time and that data is being received over the lane,
  wherein the false stall operation is to comprise sending one or more training symbols after an End Of Burst (EOB) signal over the lane instead of allowing the lane to stall, wherein the one or more training symbols are to comprise non-repeating symbols to at least partially reduce generation of Electromagnetic Interference (EMI) during the period of time, wherein the one or more training symbols are to comprise one or more SYNC packets.

2. The apparatus of claim 1, wherein the lane is to communicatively couple a first agent to a second agent.

3. The apparatus of claim 2, wherein at least one of a transmitter of the first agent and a transmitter of the second agent is to comprise the logic.

4. The apparatus of claim 2, wherein one or more of the first agent and the second agent are to comprise a plurality of processor cores.

5. The apparatus of claim 2, wherein one or more of the first agent and the second agent are to comprise a plurality of sockets.

6. The apparatus of claim 2, wherein one or more of the first agent, the second agent, the logic, and memory are on a same integrated circuit die.

7. The apparatus of claim 1, wherein the lane is to provide a point-to-point link between a first agent and a second agent.

8. The apparatus of claim 1, wherein the lane is to comprise a M-PHY lane.

9. The apparatus of claim 1, wherein the data being received over the lane is in the form of one or more Acknowledgement and Flow Control (AFC) packets.

10. A method comprising:
  determining whether to perform a false stall operation on a lane in response to a determination that no data is to be sent over the lane for a period of time and that data is being received over the lane,
  wherein the false stall operation comprises sending one or more training symbols after an End Of Burst (EOB) signal over the lane instead of allowing the lane to stall, wherein the one or more training symbols comprise non-repeating symbols to at least partially reduce generation of Electromagnetic Interference (EMI) during the period of time, wherein the one or more training symbols comprise one or more SYNC packets.

11. The method of claim 10, further comprising the lane communicatively coupling a first agent to a second agent.

12. The method of claim 10, further comprising the lane providing a point-to-point link between a first agent and a second agent.

13. The method of claim 11, wherein determining whether to perform the false stall is performed by at least one of a transmitter of the first agent and a transmitter of the second agent.

14. The method of claim 10, wherein the lane comprises a M-PHY lane.

15. The method of claim 10, further comprising transmitting the data over the lane in the form of one or more Acknowledgement and Flow Control (AFC) packets.

16. A system comprising:
a processor; and
logic to determine whether to perform a false stall operation on a lane in response to a determination that no data is to be sent over the lane for a period of time and that data is being received over the lane,
wherein the false stall operation is to comprise sending one or more training symbols after an End Of Burst (EOB) signal over the lane instead of allowing the lane to stall, wherein the one or more training symbols are to comprise non-repeating symbols to at least partially reduce generation of Electromagnetic Interference (EMI) during the period of time, wherein the one or more training symbols are to comprise one or more SYNC packets.

17. The system of claim 16, wherein the lane is to communicatively couple the processor to an agent.

18. The system of claim 16, wherein the lane is to comprise a M-PHY lane.

19. An apparatus comprising:
a system on a chip (SoC) including logic to couple to a lane of a serial link, the logic to cause the lane to enter into at least one of an active mode and an inactive mode, wherein the logic is to determine that no data is being sent on the lane but data is to be sent within a time period, and wherein the logic is to maintain the lane in the active mode and send training symbols during the time period in response to determining that no data is being sent on the lane but data is to be sent within the time period, wherein the training symbols are to comprise non-repeating symbols to at least partially reduce generation of Electromagnetic Interference (EMI) over the lane; and
a touch interface associated with the SoC, wherein the training symbols are to comprise one or more SYNC packets.

20. The apparatus of claim 19, wherein the training symbols are randomized.

21. The apparatus of claim 19, wherein the logic is to maintain the lane in the active mode in response to a determination that the lane is configured for false stall after the determination that no data is to be currently sent on the lane and that data is being currently received on the lane.

22. The apparatus of claim 19, wherein the training symbols during the time period includes a false stall period.

* * * * *